Jan. 17, 1956    C. S. SCHROEDER    2,731,099
TRACTION UNIT FOR INDUSTRIAL TRUCKS
Filed Nov. 20, 1951    3 Sheets-Sheet 1
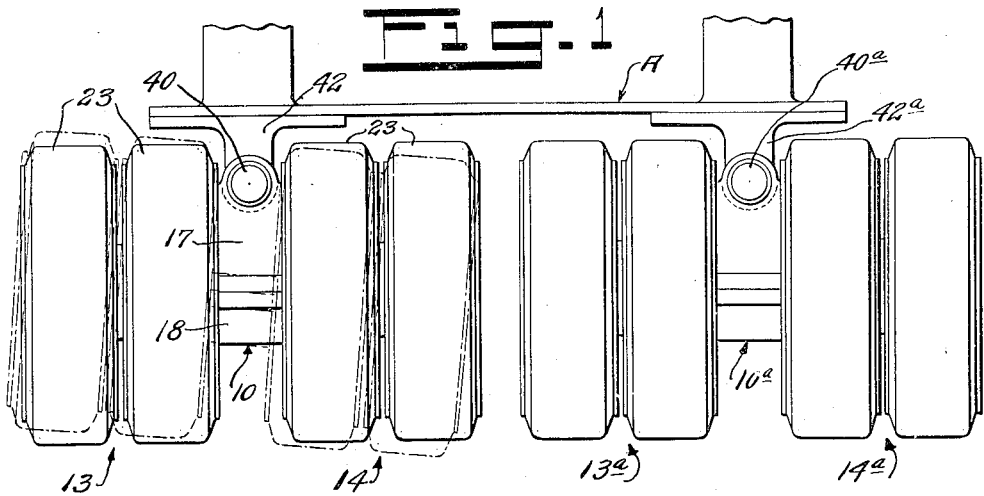
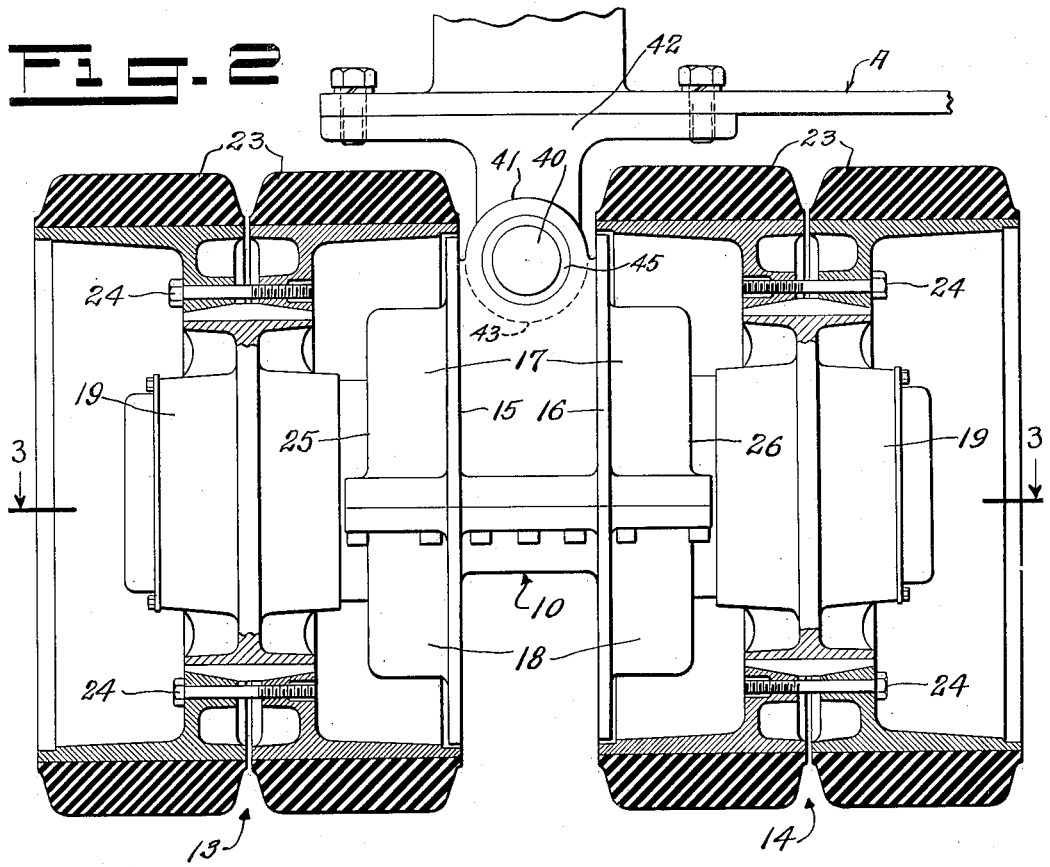
INVENTOR.
C. S. Schroeder
BY
A. H. Golden
ATTORNEY

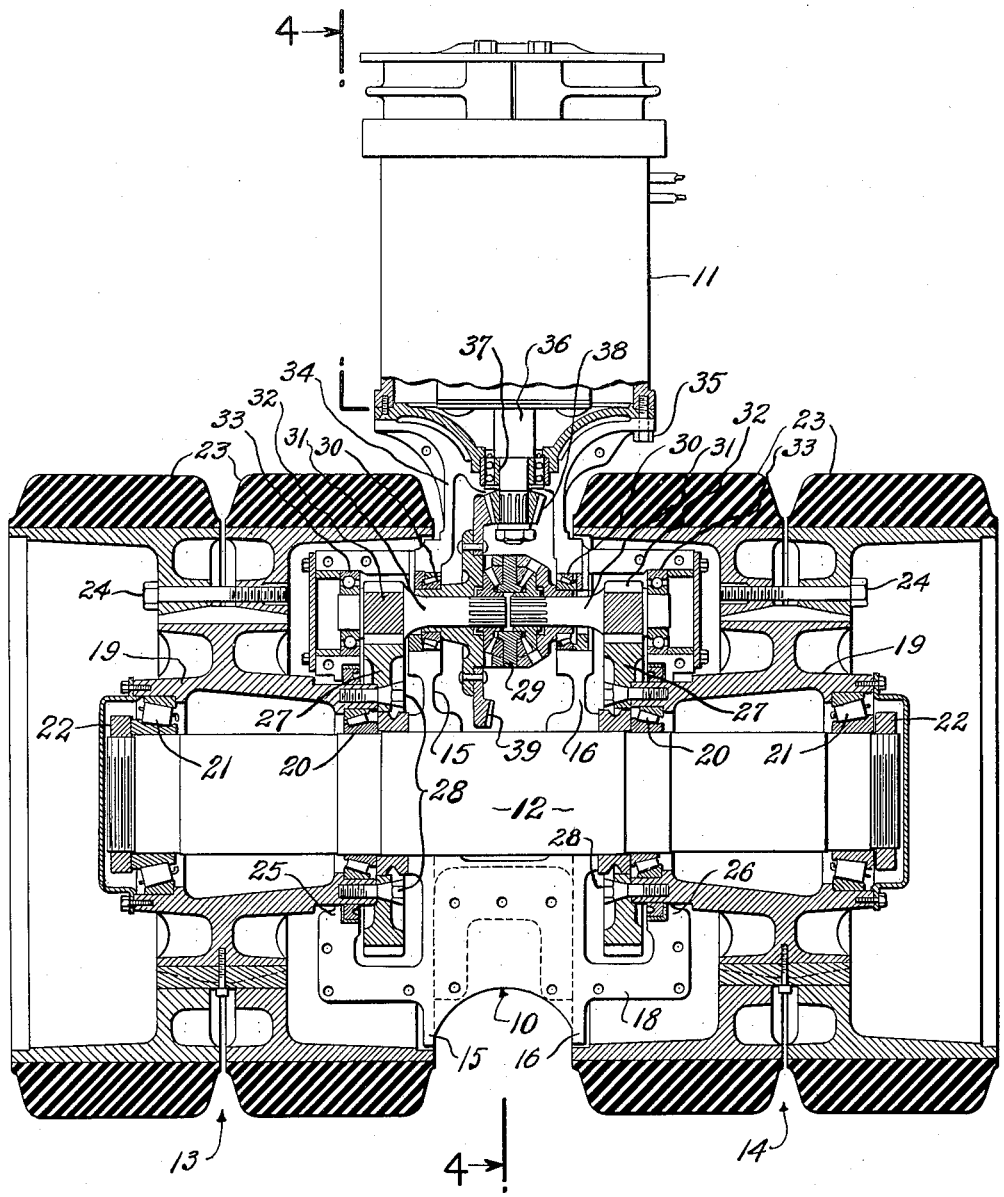

Jan. 17, 1956    C. S. SCHROEDER    2,731,099
TRACTION UNIT FOR INDUSTRIAL TRUCKS
Filed Nov. 20, 1951    3 Sheets-Sheet 3
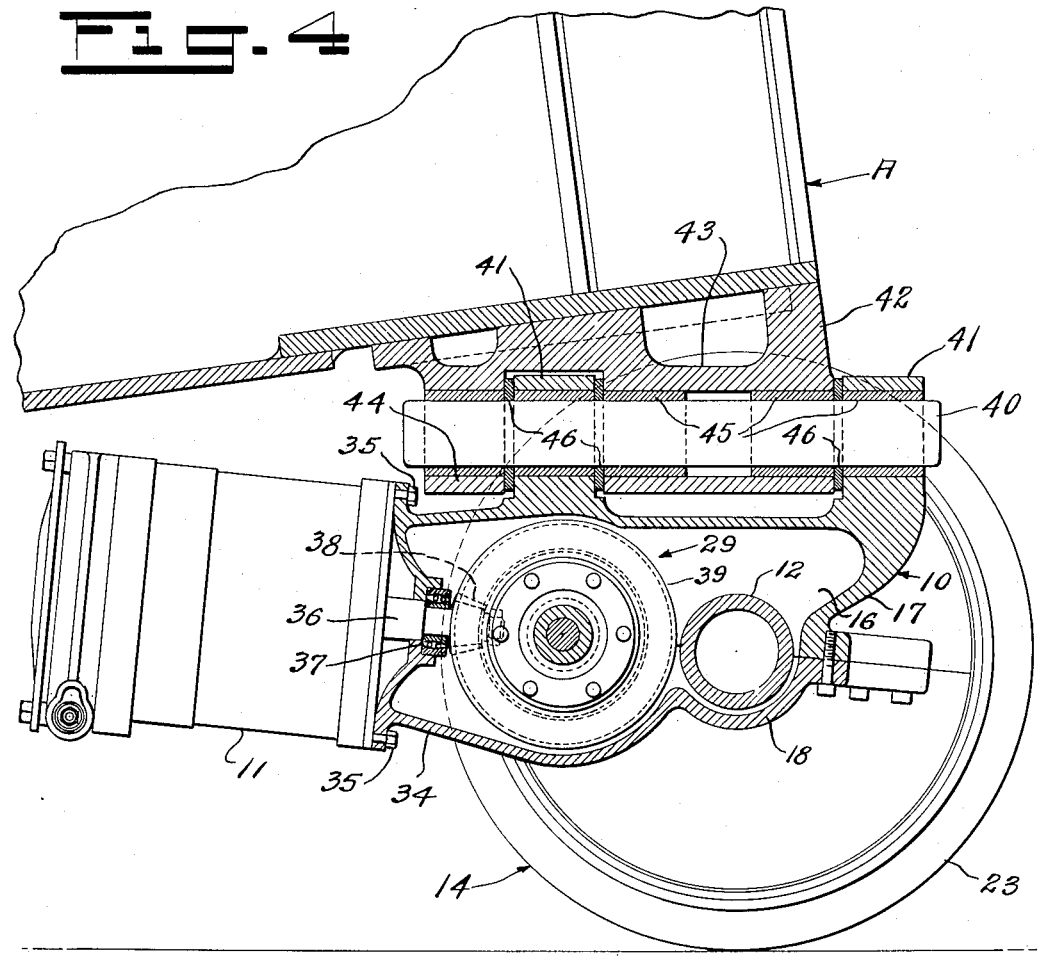
INVENTOR.
C. S. Schroeder
BY
A. H. Golden
ATTORNEY United States Patent Office 2,731,099
Patented Jan. 17, 1956

2,731,099

TRACTION UNIT FOR INDUSTRIAL TRUCKS

Charles S. Schroeder, Philadelphia, Pa., assignor to The Yale & Towne Manufacturing Company, Stamford, Conn., a corporation of Connecticut Application November 20, 1951, Serial No. 257,307

2 Claims. (Cl. 180—57)

This invention relates to a drive or traction unit for industrial trucks, and more particularly to a drive unit adapted for extremely heavy loads.

As a very important feature of my novel drive unit, I utilize a fixed unitary axle for mounting a pair of traction wheels relatively to a housing that carries a motor and a differential drive means for rotating the wheels relatively to the axle. As a part of this feature, the means whereby power is transmitted from the motor to the wheels is disposed entirely within the housing but without directly involving the axle, so that the axle is enabled to furnish a very strong and rigid mounting for the traction wheels.

As a further feature of my invention, I mount the drive unit upon the truck frame through an arrangement that permits the traction wheels at the opposite ends of the axle to follow the surface of the ground, and thus to maintain their full tractive effect when they encounter irregularities in the round surface. This I accomplish through a pivot shaft that is mounted upon the housing and that transfers the weight of the truck frame directly through the housing to a mid-portion of the axle.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

Fig. 1 is a front view, showing a pair of my novel drive units mounted on an end portion of a truck frame.

Fig. 2 is a front view partly in section, showing one of the drive units.

Fig. 3 is a cross-sectional view taken on the line 3—3 of Fig. 2.

Fig. 4 is a longitudinal section approximately on the line 4—4 of Fig. 3.

In the preferred embodiment of my novel drive unit that I have shown in the drawing, a housing 10 forms the main body portion of the unit and serves to mount a motor 11, an axle 12 having a pair of traction wheels 13, 14 on its opposed ends, and certain means to be described whereby the motor drives the traction wheels. In order to reach a full understanding of my invention, it is important to note that the axle 12 is a unitary member is fixed at its mid-portion in an internal chamber in the housing 10, as shown in Fig. 3. For the particular purpose, I form the housing 10 intermediate its ends with portions 15, 16, that extend within the internal chamber, as best seen in Fig. 3, these housing portions 15, 16 having seats that receive the mid-portion of the axle 12. The housing 10 and its portions 15, 16 are split across the seats to form upper and lower sections 17, 18 that when assembled grip the axle securely, as may best be seen in Fig. 4, thus mounting the axle integrally on the housing.

Each of the traction wheels 13, 14 have a central hub 19 that is mounted by inner and outer bearings 20, 21 for rotation upon an end portion of the axle 12. A nut 22 upon each end of the axle 12 retains the outer bearings 21, and thereby retains the hubs upon the axle. I have utilized in the wheels 13, 14 the dual wheel construction that is disclosed in the co-pending application of Charles S. Schroeder, entitled "Demountable Wheels," Serial Number 252,540, filed October 22, 1951. In this construction, a pair of rim sections 23 are drawn into wedging engagement upon the hub 19 of each wheel by bolts 24. The particular manner in which the rim sections 23 are mounted is not important to the invention that forms the subject of this application, however, although the inner rim section 23 in the wheel construction that is used will preferably overhang the housing 10 so that the treads of the wheels may occupy as much as possible of the total width of the drive unit.

Referring now to Figs. 2 and 3 of the drawings, I construct the housing 10 with outer side walls 25, 26 that define the opposed ends of the internal chamber of the housing. I have already described the position of the housing portions 15, 16 relatively to the chamber, and those portions 15, 16 may be termed inner side walls since they are inward from walls 25, 26. Each of the wheel hubs 19 extends inwardly through an opening in one of the outer walls 25, 26 of the housing 10, and inside the housing a gear 27 is integrally secured to the inner end of each hub 19 by screws 28. The gears 27 are driven by the motor 11 through the medium of a gear differential 29 that is mounted within the internal chamber of the housing and that rotates in bearings 30 in the inner walls or housing portions 15, 16 of the housing 10. The differential 29 is in driving engagement with the gears 27 through a pair of stub shafts 31, each of which is splined at one end to one of the differential gears and is meshed with one of the gears 27 through a pinion portion 32 between the inner and outer walls of the housing 10. The outer ends of the stub shafts 31 are supported by bearings 33 in the outer walls 25, 26 of the housing.

It will be observed that the driving means, including the differential 29 and the stub shafts 31 and gears 27, is very compactly arranged so as to be located almost entirely within the confines of the wheels 13, 14. The motor 11, however, is mounted with its axis approximately upon the center line of the drive unit in a position just rearwardly of the traction wheels. In order to support the motor 11 and to contain a driving connection between the motor and the differential, the housing 10 is formed with a neck 34 extending outwardly between the wheels 13 and 14. The motor 11 is secured to the neck 34 by screws 35, and the motor shaft 36 extends through a bearing 37 into the neck 34 where it has a pinion 38 fixed upon it. This pinion is meshed with a ring gear 39 upon the differential 29 and thereby drives the traction wheels 13, 14 through the differential and the gears 27.

Because of the arrangement described, I am able to mount the traction wheels 13, 14 in very close coupled relation to one another so that stresses in the axle 12 resulting from loads placed upon it through the housing 10 will be relatively small. Also, the wheels 13, 14 are permitted to have a tread width that extends across almost the entire width of the drive unit, and thereby provide efficient distribution of the load carried by the unit. At the same time, the wheels are driven through a differential action so that there is no undue resistance to steering or turning movements when the unit is operating under a heavy load.

As an important part of my invention, I mount the drive unit upon the truck through a particular means that includes a pivot shaft 40 on the housing 10, and in order to illustrate this feature I have shown in the drawing a part of a truck frame designated generally by the letter A. The pivot shaft 40 extends along the center line of the drive unit above the axle 12 and, in the example shown, this shaft is horizontally located in a position between the upper portions of the traction wheels 13, 14. Bearings for the pivot shaft 40 are provided in a pair of spaced lugs 41 that are integrally formed upon the upper portion of the housing 10, and the shaft 40 is mounted upon the truck frame A through a pedestal 42 that is secured to the truck frame and that has bearing portions 43, 44 embracing the shaft between and to the rear of the lugs 41. Preferably, the actual bearing surfaces for the pivot shaft 40 are in a series of bushings 45, and end thrust axially of the shaft 40 is accepted by washers 46 between the bearing lugs 41 of the housing and the bearing portions 43, 44 of the pedestal.

Because of the described pivot construction, the drive unit is permitted to rotate in a vertical plane relatively to the truck frame A, and the traction wheels 13, 14 may undergo relative vertical movement so as to compensate for irregularities in the ground over which the truck moves. Also, because the axle 12 is secured in the housing 10 in a fixed relation directly below the axis of the pivot shaft 40, the drive unit is capable of distributing exceptionally heavy loads between the traction wheels 13, 14 in substantially an equal manner.

I have shown in Fig. 1 a dual arrangement to which my novel drive unit is particularly adapted. Thus, two of the drive units are mounted in this arrangement through pedestals 42 and 42a at opposite sides of the truck frame A. The pivot shafts 40 and 40a permit both of the drive units to rotate independently so that all of the traction wheels 13, 14 and 13a, 14a are free to follow irregularities in the ground surface. The drive units are preferably arranged in rather closely spaced relationship transversely of the truck, and, when so arranged, the novel construction of my drive units distributes the loads carried by these units and the tractive effort supplied thereby across the entire width of the truck.

It is believed that the operation and the advantages of my novel drive unit will now be apparent from the foregoing description.

I now claim:

1. In a drive unit of the class described, a housing formed with opposed end openings and an internal chamber extending between said openings, a unitary axle positioned in said internal chamber and extending outwardly at each end through said openings, housing portions lying within the chamber intermediate the opposed ends of the housing, surfaces on said housing portions coacting with a mid-portion of the unitary axle to mount the axle in integral relation to the housing whereby the axle does not rotate or move axially relatively to the housing, a pair of wheels, a hub on each wheel encircling one end of the axle, a part of each hub extending through the corresponding end opening of the housing and positioned in the said internal chamber, bearings on the axle ends coacting with the wheel hubs to mount the wheels relatively to the housing in close-coupled relation to one another, a part of each wheel encircling and overlying an end of the housing, means on said housing intermediate those parts of the wheels that encircle the ends of the housing for mounting the drive unit on a truck, a motor carried by said housing, and differential drive means mounted within said internal chamber of the housing between the motor and each wheel hub whereby the motor rotates the wheels on the unitary axle.

2. In a drive unit of the class described, a housing formed with opposed end openings and an internal chamber extending between said openings, a unitary axle positioned in said internal chamber and extending outwardly at each end through said openings, housing portions lying within the chamber intermediate the opposed ends of the chamber, surfaces on said housing portions coacting with a mid-portion of the unitary axle to mount the axle in integral relation to the housing whereby the axle does not rotate or move axially relatively to the housing, a pair of wheels, a hub on each wheel encircling one end of the axle and extending through the corresponding end opening of the housing into the said internal chamber, bearings on the axle ends coacting with the wheel hubs to mount the wheels relatively to the housing in close-coupled relation to one another, a part of each wheel encircling and overlying an end of the housing, a gear fixed to each wheel hub within the said internal chamber of the housing, a motor carried by said housing, differential drive means mounted within said internal chamber between the motor and each gear whereby the motor rotates the wheels on their bearings, and means on said housing intermediate those parts of the wheels that encircle the ends of the housing for mounting the drive unit on a truck.

References Cited in the file of this patent

UNITED STATES PATENTS

| | | |
|---|---|---|
| 474,984 | C. Brown et al. | May 17, 1892 |
| 1,095,127 | Senderling | Apr. 28, 1914 |
| 1,210,055 | Fairman | Dec. 26, 1916 |
| 1,223,495 | Kelley | Apr. 24, 1917 |
| 1,403,563 | Post | Jan. 17, 1922 |
| 1,640,217 | Reid | Aug. 23, 1927 |
| 2,030,548 | Smeets | Feb. 11, 1936 |
| 2,053,447 | Sargent | Sept. 8, 1936 |
| 2,202,810 | Blanc | June 4, 1940 |

FOREIGN PATENTS

| | | |
|---|---|---|
| 318,870 | Germany | Feb. 14, 1920 |
| 473,449 | Germany | Mar. 16, 1929 |
| 254,952 | Italy | Sept. 30, 1927 |